US008630968B2

(12) United States Patent
Sinha

(10) Patent No.: US 8,630,968 B2
(45) Date of Patent: Jan. 14, 2014

(54) SELECTIVE CONTENT BLOCK OF POSTS TO SOCIAL NETWORK

(75) Inventor: Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 333 days.

(21) Appl. No.: 12/861,660

(22) Filed: Aug. 23, 2010

(65) Prior Publication Data

US 2011/0047117 A1 Feb. 24, 2011

Related U.S. Application Data

(60) Provisional application No. 61/235,838, filed on Aug. 21, 2009.

(51) Int. Cl.
*G06F 17/00* (2006.01)
*G06N 5/02* (2006.01)

(52) U.S. Cl.
USPC .............................................. 706/47; 724/224

(58) Field of Classification Search
None
See application file for complete search history.

(56) References Cited

U.S. PATENT DOCUMENTS

| 7,197,470 B1 | 3/2007 | Arnett et al. |
| 7,266,537 B2 | 9/2007 | Jacobsen et al. |
| 7,330,873 B2 | 2/2008 | Yoshida et al. |
| 2002/0059166 A1 | 5/2002 | Wang et al. |
| 2005/0055416 A1* | 3/2005 | Heikes et al. ................. 709/207 |
| 2005/0177414 A1 | 8/2005 | Priogin et al. |
| 2006/0218225 A1 | 9/2006 | Hee Voon et al. |
| 2007/0269783 A1 | 11/2007 | McCuller |
| 2009/0089417 A1* | 4/2009 | Giffin et al. ................. 709/224 |

OTHER PUBLICATIONS

Blair et al., U.S. Appl. No. 11/530,838, Entitled "Systems and Methods for Automated Media Filtering", filed Sep. 11, 2006, 25 pages.
U.S. Appl. No. 12/704,244, filed Feb. 11, 2010, Erhart et al.
U.S. Appl. No. 12/706,942, filed Feb. 17, 2010, Erhart et al.
U.S. Appl. No. 12/707,277, filed Feb. 17, 2010, Erhart et al.
U.S. Appl. No. 12/762,854, filed Apr. 19, 2010, Erhart et al.
U.S. Appl. No. 12/762,856, filed Apr. 19, 2010, Erhart et al.
U.S. Appl. No. 12/837,090, filed Jul. 15, 2010, Sinha.
"Twitter Shorthand for Beginners," at http://lvsonline.com/online-blogging-classes/twitter-shorthand-for-beginners/, posted Feb. 9, 2009, printed Nov. 30, 2009, 6 pages.
Fiveson, "Integrating Social Media into Your Contact Center," American Teleservices Association Convention Expo 2009, New Orleans, Oct. 2009, available at http://www.slideshare.net/kfiveson/integrating-social-media-into-your-contact-center, pp. 1-7.

* cited by examiner

*Primary Examiner* — Kakali Chaki
*Assistant Examiner* — Luis Sitiriche
(74) *Attorney, Agent, or Firm* — Sheridan Ross P.C.

(57) ABSTRACT

Mechanisms are provided herein which are directed toward monitoring a user's interaction with a website when the user is utilizing an enterprise device to conduct the interaction. The monitoring of the interaction can lead to the generation of one or more automated responses to control the interaction in accordance with enterprise policy or rules. The types of interactions which can be controlled include interactions where the user is attempting to post data on the website.

18 Claims, 3 Drawing Sheets

SELECTIVE CONTENT BLOCK OF POSTS TO SOCIAL NETWORK

CROSS-REFERENCE TO RELATED APPLICATIONS

This application claims the benefit of U.S. Provisional Application No. 61/235,838, filed Aug. 21, 2009, the entire disclosure of which is hereby incorporated herein by reference.

FIELD OF THE INVENTION

The present invention is generally directed toward communications and more specifically toward web-based communications.

BACKGROUND

With the proliferation of the Internet has also come the proliferation of blogging and social networking A social network is a social structure made of individuals (or organizations) called "nodes," which are tied (connected) by one or more specific types of interdependency, such as friendship, kinship, financial exchange, dislike, etc. A social network service focuses on building online communities of people who share interests and/or activities, or who are interested in exploring the interests and activities of others. Most social network services are web based and provide a variety of ways for users to interact, such as email and instant messaging services.

Social networking has encouraged new ways to communicate and share information. Social networking websites are being used regularly by millions of people.

While it could be said that email and websites have most of the essential elements of social network services, the idea of proprietary encapsulated services has gained popular uptake recently.

The main types of social networking services are those which contain category divisions (such as former school-year or classmates), means to connect with friends (usually with self-description pages) and a recommendation system linked to trust.

One problem that has arisen with the advent of social networking sites is that enterprise employees utilize enterprise equipment and company time to either view or engage in social networking behavior. In some instances, employees have been known to blog at work and upload content to social network sites. The obvious problem with this behavior is that company time is being wasted and employee productivity decreases. A further problem, however, is that if an employee is allowed to engage in a social network or blog from an enterprise device, there is a real chance that the employee might divulge important and proprietary enterprise information via the social network, either advertently or inadvertently. As an example, there is the possibility that an employee may share company trade secrets via a blog or social network interface. Once this information is committed to the public domain, the harm is irreparable.

It would be advantageous from an enterprise perspective to block an enterprise user's ability to post content to a blog, social network, micro-blog or the like when they are utilizing enterprise equipment. While this raises obvious freedom of speech concerns, there is a legitimate enterprise interest that should be protected if enterprise equipment is being utilized.

While some solutions have been developed to restrict an enterprise user's ability to view web content from an enterprise device, there has been little development in restricting an enterprise user's ability to post content to a web site. Present solutions do not facilitate the blocking of posted content. Rather, they only block viewed content. This will not limit a company's exposure based on an employee's behavior when interacting with a blog or social network, unless the employee is completely blocked from viewing the blog or social network. Such extreme view blocking is not favored by many enterprises, so an alternative solution is required.

SUMMARY

It is with respect to the above issues and other problems that the embodiments presented herein were contemplated. Embodiments of the present invention propose a content blocking filter that is adapted to dynamically monitor enterprise user activity on social networks, blogs, or any other publicly viewable forum, usually accessed on the Internet, and dynamically determine if the enterprise user is attempting to post objectionable content to the site. If a determination is made that objectionable content is being sent to a publicly available site, the filter may invoke a number of possible actions. As one example, the filter may completely block the message being transmitted to the site. As another example, the filter may redact the portions of the message found to be objectionable but otherwise allow the message to be posted. As another example, the filter may forward the message to security personnel, thereby allowing a user to subjectively review the content of the message and determine treatment. As another example, the filter may provide the message back to the enterprise user along with a copy of the enterprise's posting policy and ask if the enterprise user is sure that they want to post the message (this helps educate employees that are otherwise unaware that their posting activities may be prohibited under company policy). As another example, the filter may highlight the relevant portion of the enterprise's posting policy as well as possible repercussions that may occur if the message is posted. As another example, objectionable language may be replaced with less objectionable synonyms. As another example, the filter may delay the posting of the message for a predetermined amount of time until security/administrative personnel has had a chance to discuss the posting with the enterprise user and come to an agreement on whether the message will be posted or not. It should be appreciated that combinations of the above actions may also be taken.

In some embodiments, the rules used to determine whether content is objectionable may also be dynamic and somewhat flexible. In some embodiments certain keywords may be strictly prohibited while other keywords or phrases may be moderately prohibited. If a single instance of a moderately prohibited keyword is detected in a posting attempt, the post may be allowed. If, however, multiple instances or certain combinations of moderately prohibited keywords (e.g., "trade" AND "secret") are detected in a posting attempt, then the post may be disallowed or at least forwarded to security personnel for a more subjective review of the posting attempt before it is transmitted.

In some embodiments, the filter may be adapted to review the content already posted on the blog or social network to determine the context of the message that is currently being transmitted by the enterprise user. This may further help the filter intelligently analyze whether a message will be damaging to the enterprise. As an example, a single message may be somewhat harmless if it is being posted in response to another person's comments about dog shampoo products (e.g., the message "that product sucks" will not likely endanger the enterprise's interests unless the enterprise is in the business of making dog shampoo). However, the same message may be more sensitive if it is posted in response to another person's comments about a company product, such as a telephone (e.g., the message "that product sucks" will be more damaging if it is a post from an employee of a company that made said product).

As can be appreciated, freedom of speech concerns will also likely have to be accounted for by the filter, especially if the filter is being employed by a government enterprise. In some embodiments, the filter may be adapted to determine if a message has content that can be restricted without impacting the posting user's freedom of speech. If so, the filter may automatically block the message in its entirety. If not, the filter may redact portions of the message or send it to security compliance personnel for further review and analysis.

In accordance with at least some embodiments of the present invention, a method is provided that generally comprises:

detecting a user activity at a user device wherein the detected activity corresponds to a potential interaction between the user device and a web service;

analyzing the detected activity to determine one or more attributes of the detected activity;

comparing the attributes of the detected activity with a user-posting rule which defines one or more of (i) a rule for identifying restricted transmissions of data from the user device to the web service and (ii) a rule for identifying permitted transmissions of data from the user device to the web service;

based on the comparing step, determining that the detected activity corresponds to a controlled activity; and based on determining that the detected activity corresponds to a controlled activity, implementing one or more automated responses.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
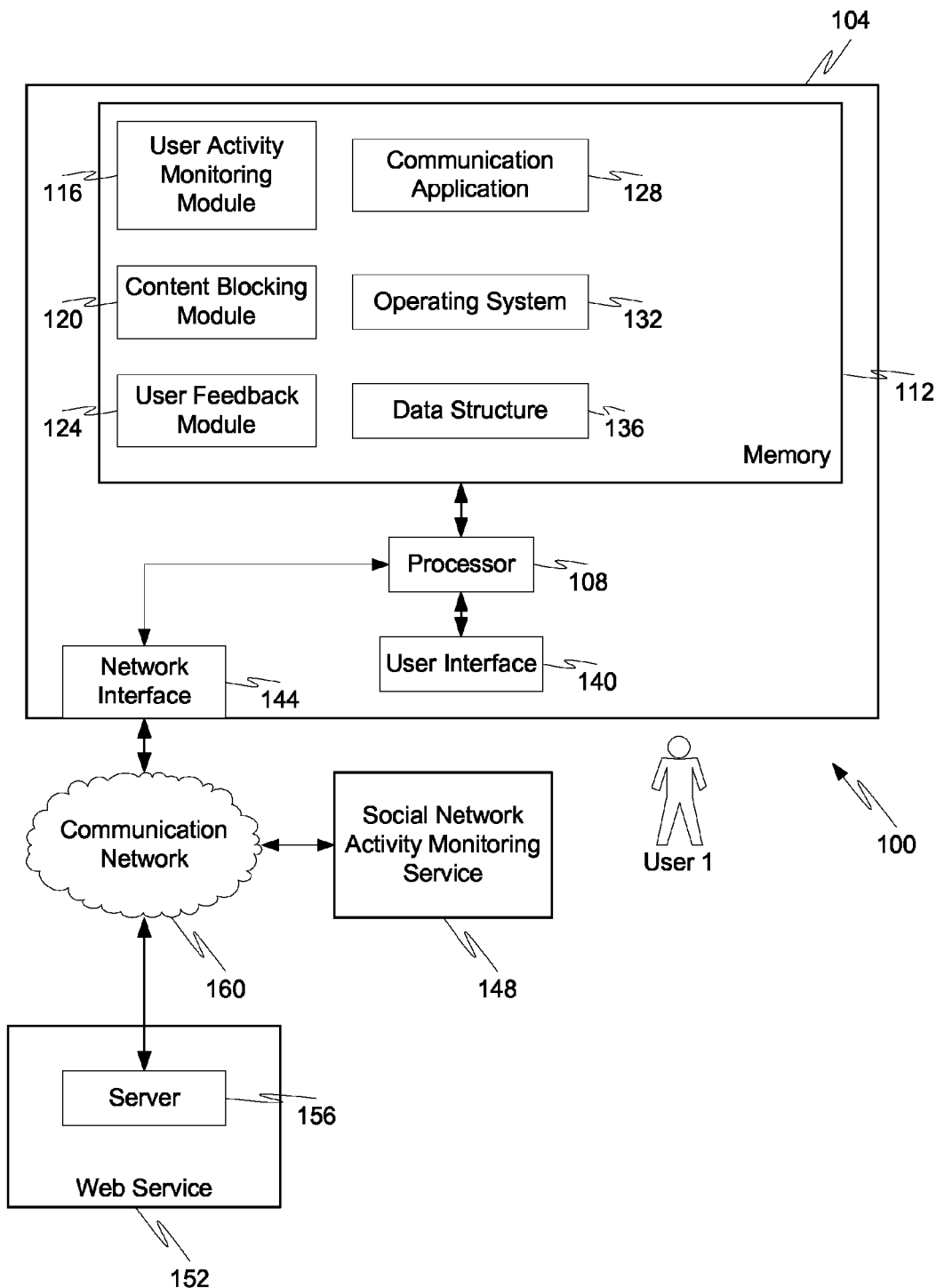
FIG. 1 is a block diagram of a communication system in accordance with embodiments of the present invention.

A communication system 100 including a user device 104 capable of allowing a user to interact with a web service 152 is shown in FIG. 1. The depicted user device 104 includes a processor 108, a memory 112, a user interface 140, and a network interface 144.

The user interface 140 may include a user input and/or user output device. The user interface 140 enables a user or multiple users to interact with the user device 104. Exemplary user input devices which may be included in the user interface 140 comprise, without limitation, a microphone, a button, a mouse, trackball, rollerball, or any other known type of user input device. Exemplary user output devices which may be included in the user interface 140 comprise, without limitation, a speaker, light, Light Emitting Diode (LED), display screen, buzzer, or any other known type of user output device.

In some embodiments, the user interface 140 includes a combined user input and user output device such as a touchscreen.

The processor 108 may include a microprocessor, Central Processing Unit (CPU), a collection of processing units capable of performing serial or parallel data processing functions, and the like.

The memory 112 may include a number of applications or executable instructions that are readable and executable by the processor 108. For instance, the memory 112 may include instructions in the form of one or more modules and/or applications. The memory 112 may also include data and rules in the form of one or more data structures 144 which can be used by one or more of the modules and/or applications. Exemplary applications include an operating system 132 and various other applications, such as a communication application 128. The operating system 132 is a high-level application which enables the various other applications and modules to interface with the hardware components (e.g., processor 108, network interface 144, and user interface 140) of the user device 104. The operating system 132 also enables a user or users of the user device 104 to view and access the applications and modules in memory 112 as well as data structures 144 contained in memory 112.

Although the applications and modules are depicted as software instructions residing in memory 112 and those instructions are executable by the processor 108, one skilled in the art will appreciate that the applications and modules may be implemented partially or totally as hardware or firmware. For example, an Application Specific Integrated Circuit (ASIC) may be utilized to implement some or all of the functionality discussed herein.

Exemplary features offered by the communication application 128 include, without limitation, communication features (e.g., voice communication applications, text communication applications, video communication applications, multimedia communication applications, etc.), web-browsing features, word-processing features, and so on. In some embodiments, the communication application 128 includes a web-browser which enables a user to interact with a server 156 of a web service 152 by one or more of (i) viewing content made available to the public by the server 156, (ii) reacting to content made available to the public by the server 156, and (iii) posting content to the server 156 for public display. The communication application 128, in some embodiments, may support the http protocol, secured versions thereof, the ftp protocol, and other known protocols used by client devices to interact with web servers 156 over a communication network 160.

In some embodiments, the communication application 128 also includes the ability to facilitate real-time communications between the user device 104 and another user device across the communication network 160. For example, the communication application 128 may include functions to support certain types of communications such as voice communications, text communications, IM communications, video communications, and multi-media communications.

Specific modules which may be included in memory 112 include, without limitation, a user activity monitoring module 116, a content blocking module 120, and a user feedback module 124.

The user activity monitoring module 116 provides the user device 104 with the ability to monitor the user's activity at the user interface 140, data processed by the processor 108, and/or data transferred to/from the communication network 160 via the network interface 144. In particular, the user activity monitoring module 116 is configured to monitor a user's interaction with the web service 152 and any other publicly-available information source. In other words, the user activity monitoring module 116 is provided to ensure that the user does not interact with the web service 152 in a way that prohibits one or more rules contained in the data structure 136. In some embodiments, the user device 104 may belong to and be administered within an enterprise network. The enterprise administering the enterprise network may have one or more rules associated with a user's interaction with web services 152. For example, the enterprise may want to ensure that sensitive information is not made publicly available (i.e., posted) by a user interacting with the web service 152.

The content blocking module 120 may contain or have access to rules for blocking certain content that a user attempts to provide to the server 156. In some embodiments, the rules which govern the operation of the content blocking module 120 may be contained within the data structure 136. The content blocking module 120 may also contain instructions for identifying certain types of controlled or objectionable actions or content as well as instructions for reacting to certain types of controlled or objectionable actions.

The user feedback module 124 is provided as an additional mechanism for controlling a user's interaction with the web service 152. The user feedback module 124 can be invoked by one or both of the user activity monitoring module 116 and content blocking module 120 to provide feedback to the user via the user interface 140. The types of feedback provided to a user from the user feedback module 124 may vary depending upon the actions which are being taken by the user. In some embodiments, rules defining the types of responses the user feedback module 124 can provide the user are contained in the data structure 136.

Although the various modules and data structures for controlling a user's interaction with the web service 152 are depicted as residing on the user device 104, one skilled in the art can appreciate that one, some, or all of the depicted components of the user device 104 may be provided on by an external server or social network activity monitoring service 148. In some embodiments, the social network activity monitoring service 148 is administered by a third-party service meaning that the entity which administers the social network activity monitoring service 148 is not the same entity that either owns or administers the user device 104. In some embodiments, the social network activity monitoring service 148 may be administered by the same enterprise that owns or administers the user device 104. As one particular example, the user device 104 may be provided in an enterprise network and the social network activity monitoring service 148 may also be provided in the same enterprise network. As one possible implementation of this scenario, the social network activity monitoring service 148 may be configured as an adjunct to an enterprise firewall system which may be contained in a gateway or Session Border Controller (SBC) which connects the enterprise network to a larger unsecured and untrusted communication network 160.

The memory 112 may also include a communication module, instead of one or more communication-based applications 128, which provides the communication functionality of the user device 104. In particular, the communication module may contain the functionality necessary to enable the user device 104 to communicate with other user devices 104 across the communication network 160. As such, the communication module may have the ability to access user communication preferences maintained within a locally-stored data structure 136 (or remotely-stored profile), format communication packets for transmission via the network interface 144, as well as condition communication packets received at a network interface 144 for further processing by the processor 108.

In some embodiments, the data structure 136 is stored directly on the user device 104. In some embodiments, the data structure 136 may be stored by the enterprise and pushed to the user device 104 on an as-needed basis. The remote storage of the data structure 136 may occur on another user device or on a server. In some embodiments, a portion of the data structure 136 is stored locally on the user device 104 and another portion of the data structure 136 is stored at an enterprise and provided on an as-needed basis.

The network interface 144 comprises components for connecting the user device 104 to a communication network. In some embodiments, a single network interface 144 connects the user device to multiple networks. In some embodiments, a single network interface 144 connects the user device 104 to one network and an alternative network interface is provided to connect the user device 104 to another network.

The network interface 144 may comprise a communication modem, a communication port, or any other type of device adapted to condition packets for transmission across a communication network 160 to a destination user device 104 as well as condition received packets for processing by the processor 108. Examples of network interfaces include, without limitation, a network interface card, a wireless transceiver, a modem, a wired telephony port, a serial or parallel data port, a radio frequency broadcast transceiver, a USB port, or other wired or wireless communication network interfaces.

The type of network interface 144 utilized may vary according to the type of network which the user device 104 is connected, if at all. Exemplary communication networks 160 to which the user device 104 may connect via the network interface 144 include any type and any number of communication mediums and devices which are capable of supporting communication sessions, such as voice calls, video calls, chats, emails, TTY calls, multimedia sessions, or the like. In situations where the communication network 160 is composed of multiple networks, each of the multiple networks may be provided and maintained by different network service providers. Alternatively, two or more of the multiple networks in the communication network 160 may be provided and maintained by a common network service provider or a common enterprise in the case of a distributed enterprise network.

Exemplary types of communication networks 160 include, without limitation, a Local Area Network (LAN), multiple LANs, a Wide Area Network (WAN), an enhanced IP-based network, a circuit-switched network, a Session Initiation Protocol (SIP) network, the Internet, the Public Switched Telephone Network (PSTN), a Plain Old Telephone System (POTS) network, an Integrated Serviced Digital Network (ISDN), a cellular communications network (e.g., 3G, 4G, etc.), an IP Multimedia Subsystem (IMS) network, or the like. In addition, it can be appreciated that the communication network 160 need not be limited to any one network type, and instead may be comprised of a number of different networks and/or network types.

As can be appreciated by one skilled in the art, functions offered by the modules depicted in FIG. 1 may be implemented in one or more network devices (i.e., servers, networked user device, non-networked user device, etc.).

Figure 2:
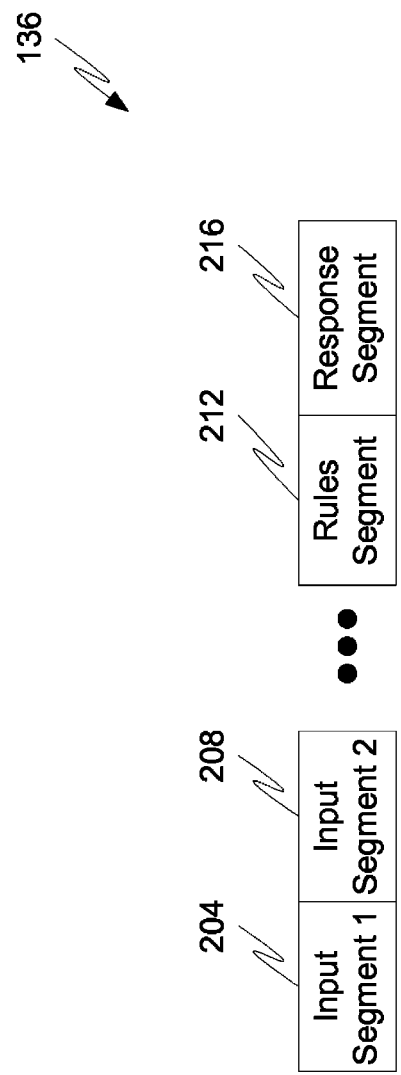
FIG. 2 is a block diagram depicting an exemplary data structure utilized in accordance with embodiments of the present invention.

An embodiment of the data structure 136 is shown in FIG. 2. The data structure 136 can be stored in several different forms of databases, such as relational databases, flat files, object-oriented databases, etc. Thus, while the term "data field" or "segment" is used, the data may be stored in an object, an attribute of an object, or some other form of data structure. Further, the data structure 136 can be stored, retrieved, sent, or received during the processing communication session information by one or more of the modules discussed herein. The data structure 136 stores one or more items of information in one or more data fields. The numeric identifiers (e.g. 212, 216, etc.) shown in FIG. 2 can identify, in one or more fields or segments, either the data field or segment or the data stored in the data field or segment.

The data structure 136 may be separated into two or more portions, although such a separation is not required. For example, the data structure 136 may comprise separate portions dedicated to different types of controlled activities or content. As another example, the data structure 136 may comprise portions dedicated to identifying objectionable actions and other portions dedicated to rules for responding to identified objectionable actions. Other types of data structure 136 organization may be utilized without departing from the scope of the present invention.

In some embodiments, the data structure 136 includes one or more input segments, such as, input segment 1 204 and input segment 2 208, a rules segment 212, and a response segment 216. Input segments each include one or more fields comprising the one or more inputs that may be required to identify an activity or content as objectionable or controlled. The input segments may include a user identity, one or more keywords, one or more key phrases, context analysis rules, etc.

While there are only two input segments shown in FIG. 2, there may be more or fewer input segments associated with the data structure 136, as indicated by the ellipses.

The rules segment 212 can include one or more heuristic rules that either help with further identifying objectionable content or controlled actions and/or rule sets defining objectionable content or controlled actions. As used herein, a controlled action may correspond to any type of user interaction with a web service 152 via an enterprise-administered user device 104 where the user interaction includes one or more identified types of objectionable content. As one example, the rule 212 can state that the data structure 136 applies to a communication session only if the communication session includes input segment 1 204 but not input segment 2 208. As another example, the rule 212 can state that the data structure 136 applies to an action if both input segment 1 204 and input segment 2 208 are satisfied.

When the rule segment 212 dictates that the data structure 136 should apply to a particular action, then the actions identified in the response segment 216 are invoked to respond to the action.

One skilled in the art will be able to identify other types of rules that may govern the association of the data structure 136 with various types of data inputs created within the system 100 (e.g., location data inputs, presence data inputs, context inputs, communication activity data inputs, device operation data inputs, etc.). Accordingly, multiple data structures 136, such as those depicted in FIG. 2, may be contained within memory 112.

As noted above, the response segment 216 may contain one or more rules defining the types of responses that should be taken when objectionable content or a controlled activity is detected. The responses identified in the response segment 216 may be automatically invoked by one or more of the modules depicted in FIG. 1. Accordingly, the data contained in the response segment 216 may either include instructions for executing an appropriate response or a flag which causes the appropriate instructions to be executed by the one or more modules depicted in FIG. 1. In some embodiments, the response identified in the response segment 216 may include a hybrid automated-manual response.

Figure 3:
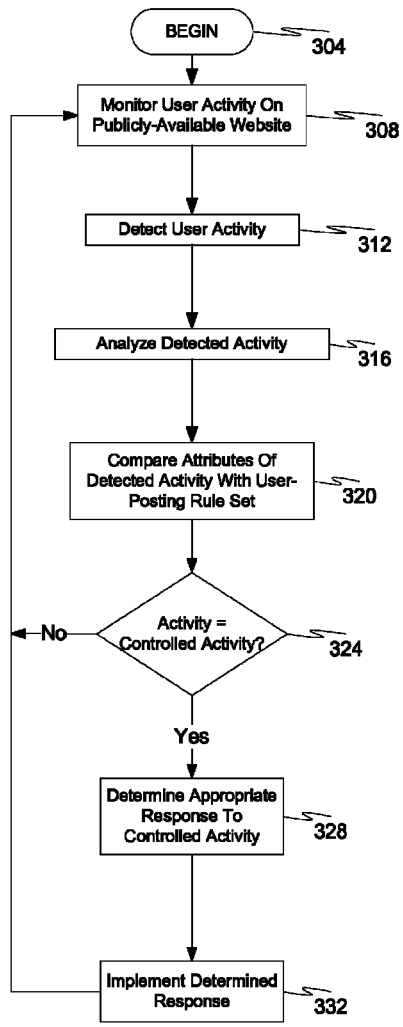
FIG. 3 is a flow diagram depicting an exemplary communication method in accordance with embodiments of the present invention.

With reference now to FIG. 3, an exemplary communication method will be described in accordance with at least some embodiments of the present invention. The method begins in step 304 and continues with the user activity monitoring module 116 monitoring user activity at their user device 104 and specifically monitoring user activity on the user device 104 when the user is interacting with a publicly-available website, such as the web service 152 (step 308). The term "publicly-available" may refer to those websites which are commonly available to all members of the public as well as those websites which are protected by one or more of a user name, password, certificate, encryption key, and the like. In other words, a web service 152 that is used to make content available outside of an enterprise network to which the user device 104 belongs may be considered publicly-available. Accordingly, a publicly-available website may correspond to any website that is separated from the user device 104 by an enterprise gateway, firewall, or the like.

The user activity monitoring module 116 may either monitor user activity continuously or periodically. The method continues when the user activity monitoring module 116 detects a user activity at the user device 104 (step 312). Such user activity may include any user inputs, data transfers, or processing steps performed by the processor 108 of the user device 104.

The user activity monitoring module 116 continues by analyzing the detected activity and determining the attributes thereof (step 316). In this step, the user activity monitoring module 116 may consider whether the user activity corresponds to the user interacting with a publicly-available website as well as analyzing content of the activity. In particular, the user activity monitoring module 116 may analyze the text entered by the user, the text already on the web site (i.e., to determine a context of the activity), location of the user device 104, properties of the website hosted by the web service 152 (i.e., domain name, domain host, public nature of the website, etc.) and other content that can help determine whether the activity is a controlled activity.

The user activity monitoring module 116 then compares the attributes of the detected activity with one or more rules defining either allowed or prohibited user-posting activities (step 320). In this step, the user activity monitoring module 116 may utilize the attributes of the detected activity as inputs to one or more of the input segments 204, 208 of the data structures 136 contained in memory 112 to determine if one or more such data structures 136 apply to the activity and the response segments 216 thereof should be invoked.

If multiple data structures 136 are contained in memory 112, the user activity monitoring module 116 may compare each data structure 136 to the attributes of the detected activity either in parallel or in a serial fashion. If the data structures 136 are traversed serially, then the user activity monitoring module 116 may elect to stop searching once one of the data structures 136 is determined to apply to the user activity or it may continue searching to determine if multiple data structures 136 apply to the user activity.

Based on the comparison of the attributes of the user activity with the user-posting rule set(s), the user activity monitoring module 116 determines if the activity corresponds to a controlled activity (i.e., it contains some form of objectionable content). As noted above, the activity may correspond to a controlled activity based on the fact that it actually or substantially satisfies a rule defining restricted user activity.

If the activity does not correspond to a controlled activity, then the method returns to step 308. If, however, the methods corresponds to a controlled activity, then the method continues with the user activity monitoring module 116 invoking one or both of the content blocking module 120 and user feedback module 124 to determine an appropriate response or set of responses for addressing the detection of the controlled activity (step 328). If multiple controlled activities are detected, then multiple responses may be implemented. Alternatively, if multiple controlled activities are detected, then a single response may be implemented. Likewise, if a single controlled activity is detected, then one, two, three, or more responses may be implemented as appropriate. The activities which are implemented can vary depending on a number of conditions such as context, the type of activity, and so on. Such responses are generally defined in the response segment 216 of the data structure 136 that was determined to apply to the detected activity. In most circumstances, the response is implemented automatically and without any additional user interaction, although some responses may comprise automatically forwarding the content of the controlled activity to a person responsible for administering the enterprise network with which the user device 104 is associated.

There are a great number of possible responses which may be implemented in accordance with at least some embodiments of the present invention. Some examples of those responses include, without limitation, completely blocking a message being transmitted to the web service 152, redacting portions of a message found to be objectionable but otherwise allowing the message to be transmitted to the web service 152, forwarding the message to security personnel, providing a message back to the user along with a copy of the enterprise's posting policy and ask if the enterprise user is sure that they want to post the message, highlighting the relevant portion of the enterprise's posting policy as well as possible repercussions that may occur if the message is posted, replacing objectionable language with less objectionable synonyms, delaying the transmission of the message to the web service 152 for a predetermined amount of time until security/administrative personnel has had a chance to discuss the posting with the enterprise user and come to an agreement on whether the message will be posted or not, and combinations thereof.

After an appropriate response or set of responses has been identified, the method continues with the appropriate module(s) implementing the determine response or set of responses (step 332). Once implemented, the method returns to step 308.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method, comprising:
   detecting, by a processor, a user activity at a user device wherein the detected activity corresponds to a potential interaction between the user device and a web service;
   analyzing the detected activity to determine one or more attributes of the detected activity;
   comparing the attributes of the detected activity with a user-posting rule which defines one or more of (i) a rule for identifying restricted transmissions of data from the user device to the web service for display by the web service and (ii) a rule for identifying permitted transmissions of data from the user device to the web service for display by the web service, the user-posting rule comprising at least one input segment, a rules segment, and a response segment, the at least one input segment including one or more of a user identity, one or more keywords, one or more key phrases, and one or more context analysis rules, the rules segment including one or more heuristic rules, and the response segment including one or more actions to be applied, and wherein the user-posting rule is at least partially context based and wherein the method further comprises:
   analyzing content that is already publicly-available via the web service;
   determining a context of the detected activity based on the content that is already publicly-available via the web service; and
   adjusting the user-posting rule by designating the detected activity as permitted or restricted based on the determined context;
   based on the comparing step, determining that the detected activity corresponds to a controlled activity; and
   based on determining that the detected activity corresponds to a controlled activity, implementing one or more automated responses.

2. The method of claim 1, wherein the controlled activity comprises a message which was generated by the user and attempted to be transmitted to the web service and wherein the one or more automated responses include at least one of blocking the message, redacting portions of the message, forwarding the message to security personnel, providing warning a message back to the user, providing a posting policy back to the user, highlighting an objectionable portion of the message, identifying possible repercussions that may occur if the message is posted by the web service, replacing objectionable content of the message with a synonym, and delaying the transmission of the message for a predetermined amount of time.

3. The method of claim 2, wherein a plurality of the one or more automated responses are implemented.

4. The method of claim 1, wherein the user device is administered by an enterprise and wherein the web service is not administered by the enterprise.

5. The method of claim 4, wherein the user-posting rule is established by the enterprise.

6. The method of claim 1, wherein the detected user activity corresponds to one or more of a user input, an attempted data transfer, and a processing request.

7. The method of claim 1, wherein the comparing step comprises comparing content of the detected activity with one or more of a keyword and key phrase contained within the user-posting rule.

8. A non-transitory computer readable medium having stored thereon instructions that cause a computing system to execute a method, the instructions comprising:
   instructions configured to detect a user activity at a user device wherein the detected activity corresponds to a potential interaction between the user device and a web service;
   instructions configured to analyze the detected activity to determine one or more attributes of the detected activity;
   instructions configured to compare the attributes of the detected activity with a user-posting rule which defines one or more of (i) a rule for identifying restricted transmissions of data from the user device to the web service for display by the web service and (ii) a rule for identifying permitted transmissions of data from the user device to the web service for display by the web service, the user-posting rule comprising at least one input segment, a rules segment, and a response segment, the at least one input segment including one or more of a user identity, one or more keywords, one or more key phrases, and one or more context analysis rules, the rules segment including one or more heuristic rules, and the response segment including one or more actions to be applied, and wherein the user-posting rule is at least partially context based and wherein the instructions further comprise:

instructions configured to analyze content that is already publicly-available via the web service;

instructions configured to determine a context of the detected activity based on the content that is already publicly-available via the web service;

instructions configured to adjust the user-posting rule by designating the detected activity as permitted or restricted based on the determined context;

instructions configured to determine that the detected activity corresponds to a controlled activity; and instructions configured to implement one or more automated responses to the controlled activity.

9. The computer readable medium of claim 8, wherein the controlled activity comprises a message which was generated by the user and attempted to be transmitted to the web service and wherein the one or more automated responses include at least one of blocking the message, redacting portions of the message, forwarding the message to security personnel, providing warning a message back to the user, providing a posting policy back to the user, highlighting an objectionable portion of the message, identifying possible repercussions that may occur if the message is posted by the web service, replacing objectionable content of the message with a synonym, and delaying the transmission of the message for a predetermined amount of time.

10. The computer readable medium of claim 8, wherein the detected user activity corresponds to one or more of a user input, an attempted data transfer, and a processing request.

11. The computer readable medium of claim 8, wherein the instructions configured to compare the attributes of the detected activity with a user-posting rule compare content of the detected activity with one or more of a keyword and key phrase contained within the user-posting rule.

12. A communication system, comprising:

a user device including a user interface and a network interface, the network interface connecting the user device to a web service via a communication network;

a user activity monitoring module configured to detect a user activity at the user device wherein the detected activity corresponds to a potential interaction between the user device and the web service, analyze the detected activity to determine one or more attributes of the detected activity, compare the attributes of the detected activity with a user-posting rule which defines one or more of (i) a rule for identifying restricted transmissions of data from the user device to the web service for display by the web service and (ii) a rule for identifying permitted transmissions of data from the user device to the web service for display by the web service, and determine that the detected activity corresponds to a controlled activity, the user-posting rule comprising at least one input segment, a rules segment, and a response segment, the at least one input segment including one or more of a user identity, one or more keywords, one or more key phrases, and one or more context analysis rules, the rules segment including one or more heuristic rules, and the response segment including one or more actions to be applied, and wherein the user-posting rule is at least partially context based on content that is already publicly-available via the web service, and wherein the user-posting rule is adjusted by designating the detected activity as permitted or restricted based on the determined context; and a module to implement one or more automated responses to the controlled activity.

13. The system of claim 12, wherein the module to implement the one or more automated responses to the controlled activity comprises one or more of a content blocking module and a user feedback module.

14. The system of claim 12, wherein at least one of the user activity monitoring module and the module to implement one or more automated responses resides at a social network activity monitoring service.

15. The system of claim 14, wherein the social network activity monitoring service is administered by an enterprise that also administers the user device.

16. The system of claim 12, wherein at least one of the user activity monitoring module and the module to implement one or more automated responses resides on the user device.

17. The system of claim 12, wherein the controlled activity comprises a message which was generated by the user and attempted to be transmitted to the web service and wherein the one or more automated responses include at least one of blocking the message, redacting portions of the message, forwarding the message to security personnel, providing warning a message back to the user, providing a posting policy back to the user, highlighting an objectionable portion of the message, identifying possible repercussions that may occur if the message is posted by the web service, replacing objectionable content of the message with a synonym, and delaying the transmission of the message for a predetermined amount of time.

18. The system of claim 12, wherein the detected user activity corresponds to one or more of a user input, an attempted data transfer, and a processing request.

* * * * *